Jan. 28, 1947.      D. R. DEMALINE      2,414,859
AIRCRAFT LANDING WHEEL SUPPORT
Filed Nov. 22, 1944
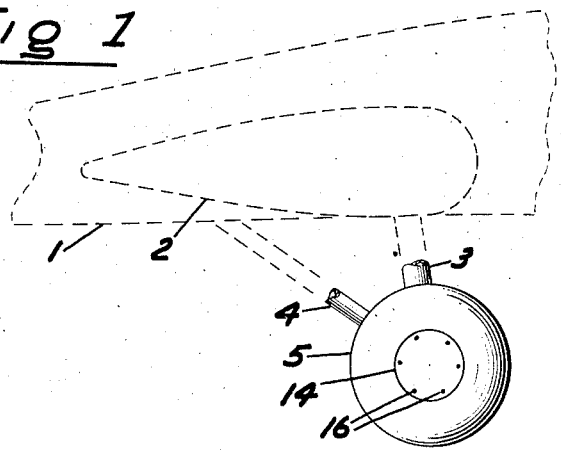
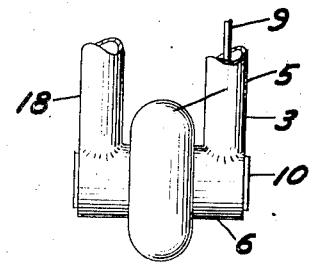
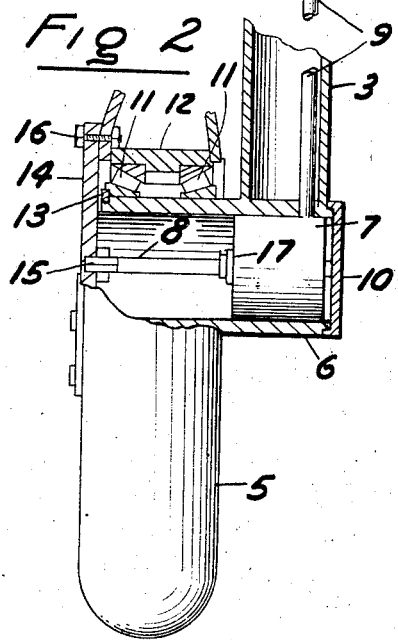
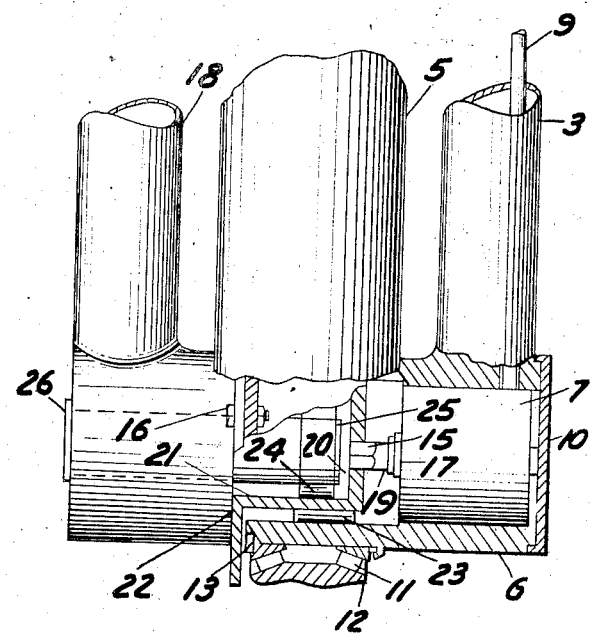
Inventor
Donald R. Demaline
By
Geo E Kirk
Attorney Patented Jan. 28, 1947

2,414,859

UNITED STATES PATENT OFFICE 2,414,859

AIRCRAFT LANDING WHEEL SUPPORT

Donald R. Demaline, Toledo, Ohio

Application November 22, 1944, Serial No. 564,627

2 Claims. (Cl. 244—103)

This invention relates to self-propelled landing wheels for aircraft.

This invention has utility when incorporated in controllable prime mover units aligned with and exterior of the hubs of landing wheels for airplanes, with the wheels and prime mover units as independently mounted for separate assembly and removal.

Referring to the drawing:

Fig. 1 is a fragmentary side elevation of an embodiment of the invention with an outboard landing wheel of an airplane;

Fig. 2 is a partial section thru the hub and mounting arm for the outboard landing wheel of Fig. 1;

Fig. 3 is a detail view, with parts broken away, of an inboard landing wheel for an airplane; and Fig. 4 is a showing, on an enlarged scale of features of the wheel hub and mounting arm terminus to show the assembly and drive connections.

A heavier-than-air aviation vehicle with fuselage 1 and plane 2 is shown provided with retractable mounting arm 3 and strut 4 so that a landing wheel 5 for the vehicle may be located more close to or concealed within the fuselage 1 while in flight.

Under the invention herein, the arm 3 has its free or lower end portion provided with an open ended transverse cylindrical seat or casing 6 in which may be located an electric motor 7 of built-in variable speed transmission therefrom to a protruding shaft 8. A conduit 9 in the tubular or hollow collapsible arm or mounting 3 extends to the operator or pilot in the fuselage 1, to the end that the motor 7 may be started or stopped at will, as well as in starting the speed at which the shaft 8 is to be actuated may be determined. A closure or hub cap 10 is readily removable to permit inspection or replacement of the multi-speed motor unit 7.

The cylindrical casing or seat 6 protrudes outboard from the arm 3 as a carrier for anti-friction bearing 11 at a hub 12 for the wheel 5. A removable nut or collar 13 on the end of the casing 6 remote from the arm 3, when in position holds the wheel unit in the assembly. Upon removal of the nut 13, the wheel 5 may be cleared from the arm 3 and the casing 6 independently of the motor unit 7.

With the wheel and motor assembled, a transmission connection is effected by assembling disk 14 to have a key connection 15 with the end of the shaft 8 remote from the motor 7. Bolts 16 anchor the disk 14 with the wheel 5. Accordingly, as the aircraft approaches landing, and the landing wheels are located outward from the fuselage, the pilot may cut in the motor unit 7 to have the wheel 5 turning at a speed approximating in the wheel periphery that of the air vehicle, to the end that as the wheel 5 contacts the runway on the landing field, there is not rasping or tearing of the pneumatic tired wheel tread, and the wheel tire life is increased. Inasmuch as the motor unit 7 is of relatively small or inadequate power to propel the landing craft, there is not operation to pick up such landing load and carry it forward. In practice, as the landing contacts are made, one direction drive connection 17 for the shaft 8 allows the wheel 5 to roll along independently of transmission back into the motor thru the speed reduction, whether or not the motor 7 be cut out as to its electric power drive. Accordingly, with the motor 7 within the control of the pilot at all times, the pilot may cutout the drive for the motor 7 at once the wheel 5 contacts the landing runway.

With the construction of the tubular or cylindrical casing 6, there is rigidity for the mounting of the wheel 5. Additionally there is substantial shield for the motor 7.

For an inboard bearing, mounting arms 3, 18, may mount therebetween one of the airplane landing wheels 5, each of which landing wheels it is preferable to have equipped with an individual motor drive, thereby to conserve tire life therefor. In this adaptation, instead of the extended shaft section 8 (Fig. 2), there may be a less projection extent for a shaft 19 having its slip key connection 15 with a head 20 for a cylindrical or shell portion 21 terminating outwardly in a flange 22 connected by bolts 16 with the wheel 5. The wheel 5 has its bearing 11 at its hub 12. A lock nut or washer 13 holds the wheel 5, thru its bearing 11, in assembled relation with the tubular axle or cylindrical casing 6 from the arm 3. An antifriction bearing 23 maintains the shell or cup portion 21 central in the casing 6. Within the portion 21 is an additional antifriction bearing 24 centering therein a stub shaft 25 having detachable assembly 26 with the arm 18. The stub shaft 25 is thus mounted in alignment with the casing 6 of the tubular axle. There is thus a stable inboard setup for the wheel 5. In this embodiment, the motor unit 7 may be readily taken out by removal of the hub-cap-like disk 10. Independently of removing the motor unit 7, there may be withdrawal of the stub shaft 25 for the arm 18 to allow clearway to release the nut 13 and thereby permit the wheel 5 as a unit to be taken away from the arm 3. Accordingly servicing may be made selectively for the wheel as well as for the multispeed motor unit 7. The landing hazards for the wheel 5 and the motor 7 are not so structurally inter-related that one necessarily involves the other. The configuration of the tubular axle 6 to provide a housing or seat for the multi-speed motor unit 7, in its general dimension works out as a most substantial and adequate carrier for absorbing landing shocks from the wheel 5. These values for retaining normal performance characteristics under considerable abuse are present in the live landing wheel embodiments, whether inboard or outboard hereunder.

In accordance with the disclosure herein, the hub cap means 10, may be removed, whether the motor unit 7, be assembled in the outboard or inboard construction or embodiment. With the cap 10 taken off, the slip or key connection 15, allows the motor unit 7 to be withdrawn from the casing or tubular axle portion 6 as laterally of the wheel 5. The control for the motor unit 7 is thru the conduit 9 as in the arm 3. Considering the prime mover as an electric motor, electric current supply lines 27, to a manual control device 28 in convenient location for the pilot of the aircraft to give attention thereto, thus enable ready control for freely spinning the respective landing wheels 5 at a desired speed just prior to landing. The pilot as determining the speed at which the wheels 5 are to be spun, may then cut out the unit 7, even before actual landing contact for the wheels 5.

Whether or not the motor unit 7 be in the casing 6, the landing wheel 5 may have its transmission connection plate 22, or 14, taken off, by removing the bolts 16. There is then exposed the nut 13, which as taken off, allows the wheel 5 to be slipped off the tubular axle lateral cylindrical projection as away from the arm 3. This cylindrical portion 6 at the lower free end of the downwardly extending arm 3 thereby locates the motor unit 7 in alignment with the axis of the wheel 5, but laterally of the tubular axle therefor. The tubular axle is thus a transverse extension away from the arm 3.

What is claimed and it is desired to secure by Letters Patent is:

1. An aircraft landing wheel support including an arm having a tubular axle extending transversely of its free end and providing an outward portion from the arm, a landing wheel rotatably mounted on the outwardly extending axle portion, said axle having an open end adjacent the arm, and laterally from the wheel a multispeed motor unit in said open end of the axle, said unit being insertable and removable therefrom independently of disturbing the wheel mounting on the axle, and a transmission connection from the unit thru the axle to the wheel, and remote control connections for the motor unit extending thru the arm, said wheel and motor unit each being removable from the axle independently of the other.

2. An aircraft landing wheel support including a pair of arm means, a landing wheel therebetween, a tubular axle between the arm means to support the wheel, said axle having an outward open end, and laterally from the wheel a multispeed motor unit in said open end of the axle, said unit being insertable and removable therefrom independently of disturbing the wheel mounting on the axle, a transmission connection from the unit thru the axle to the wheel, and nesting with said transmission connection a stub shaft carried by the arm means and extending into the axle toward the motor.

DONALD R. DEMALINE.